Feb. 22, 1949.   C. C. HEIN   2,462,186
RECTIFIER
Filed March 15, 1945
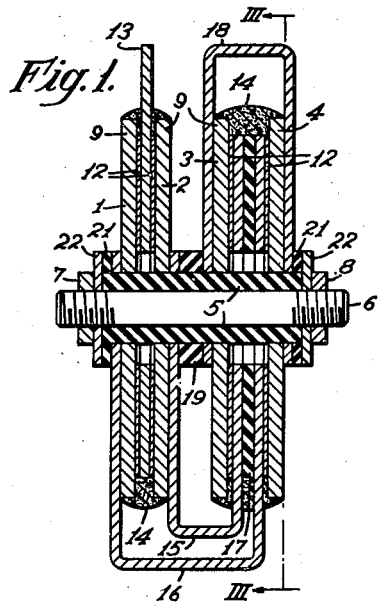
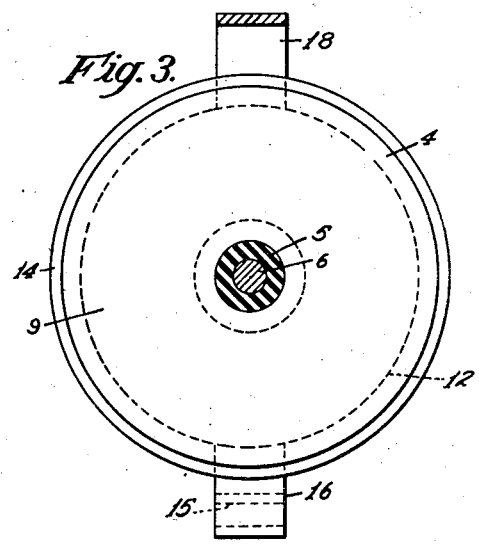
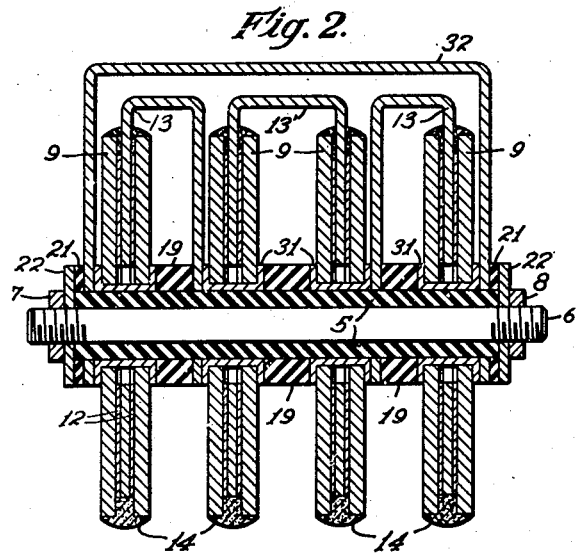
WITNESSES:
Edward M. Michaels
Nw. C. Groome
INVENTOR
Carl C. Hein.
BY
F. N. Lyle
ATTORNEY Patented Feb. 22, 1949

2,462,186

UNITED STATES PATENT OFFICE 2,462,186

RECTIFIER

Carl C. Hein, Forest Hills, Pa., assignor to Westinghouse Electric Corporation, East Pittsburgh, Pa., a corporation of Pennsylvania Application March 15, 1945, Serial No. 582,895

1 Claim. (Cl. 175—366)

My invention relates to dry-contact rectifiers, and in particular, relates to arrangements for protecting such rectifiers from effects of humidity, fumes and the like in the surrounding atmosphere.

It is frequently necessary to operate dry-contact rectifiers of the selenium or copper oxide type in rooms, such as battery charging stations, where chemically active fumes are present in great or less degree in the atmosphere. Such atmospheres will often attack the constituent materials of the rectifiers chemically, and gradually destroy their usefulness for the purposes for which they are intended. While various coatings and varnishes have been applied to cover the exposed surfaces of the rectifiers under such circumstances, and these are effective in many situations, other cases are met with where the developments of cracks or leaks in the coatings has ultimately detracted from their protective value.

One object of my invention is to accordingly provide an arrangement for improved method of protecting rectifiers of the dry-contact type from the deleterious effects of chemically active atmospheres.

Another object of my invention is to provide an arrangement by which the portions of dry-contact rectifiers which appear to be more susceptible to the injurious effect of surrounding atmospheres may be protected by coatings of greater thickness but small exposed surface.

Another object of my invention is to provide an arrangement by which protective means, capable of preventing corrosive attacks on the more susceptible portions dry-contact rectifiers, may be limited to a comparatively small surface area, while leaving other portions of the rectifier surfaces, which are less susceptible to chemical attack, either bare of coating or covered with a comparatively thin coverage which does not impede the efficient cooling of the rectifiers.

Still another object of my invention is to provide a method of mounting dry-contact rectifiers in a plurality of groups of two rectifier units each, such groups being effectively protected against the corrosive effects of the atmosphere while still permitting effective cooling.

A still further object of my invention is to provide an arrangement for mounting dry-contact rectifiers in groups each comprising a pair of rectifiers, thereby permitting the operation of unit rectifiers of a given size at higher power ratings than would be possible with the same cooling facilities under conditions of the prior art.

Other objects of my invention will become apparent upon reading the following description, taken in connection with the drawing, in which:

Fig. 1 shows an arrangement of two pairs of unit rectifiers embodying the principles of my invention, supported on a through bolt to form a full-wave bridge, each arm of said bridge consisting of a single unit rectifier;

Fig. 2 shows an arrangement in which a plurality of pairs of dry-contact rectifiers embodying the principles of my invention are mounted on a through bolt to form a full-wave bridge or Graetz connection, each of the four arms of said bridge comprising two unit rectifiers in multiple with each other; and Fig. 3 is a view along the line III—III in Fig. 1.

Referring in detail to Fig. 1, four unit rectifiers 1, 2, 3, 4, which may be of the selenium dry-contact type or of the cuprous oxide type or any similar type of dry-contact rectifier, are provided with suitable central holes and mounted on a tube 5 of insulating material. Through the center of the tube 5 passes a bolt 6 having threaded ends which respectively engage nuts 7 and 8. Each of the unit rectifiers 1 to 4 comprises a base plate 9, a cooperating layer and a contact layer 12 of some type, of which there are numerous instances known in the rectifier art, which provide unilateral conductivity to currents flowing between the base plate 9 and the contact layer 12. The copper oxide rectifier described in Grondahl Patent 1,640,335 may be taken as a typical example of such dry-contact unit rectifiers. The unit rectifiers are mounted in pairs, as illustrated in the case of units 1 and 2, with the directions in which they are more readily conductive pointing in opposite directions. In general, it will be found that one or the other of the outside surfaces 9 or 12 is less susceptible to corrosion or chemical attack by the atmosphere than the other; and preferably the units should be mounted with the more susceptible surfaces facing toward each other. For example, copper oxide rectifiers usually consist of a fairly thick plate of copper, coated with a relatively thin layer of cuprous oxide, covered in turn by a rather thin contact surface of sprayed metal, nickel plating or evaporated metal in ways well known in the art. The heavy copper plate is less injuriously affected by chemical attack, and accordingly the metal sprayed faces of the units should face each other. Similarly, selenium rectifiers consist of a relatively heavy base plate on which the selenium and a contact layer are supported, and the base plates are less susceptible to chemical attack.

Accordingly, the pairs of unit rectifiers, such as 1 and 2 in Fig. 1, are mounted respectively on opposite sides of terminal plate 13, which may be of any suitable conducting material fairly inert to chemical corrosion. The base plates 9 are preferably made to extend slightly outward beyond the peripheries of the coatings 12 and thus form a peripheral groove which may be filled with a suitable chemically inert material 14, adapted to prevent the atmosphere from penetrating readily to the region of the layers 12. At one portion the terminal plate 13 is provided with an extension which passes through the filler 14 and forms an electrical circuit connection for the rectifier contact layers 12.

The structure so far described constitutes what may be termed a rectifier pair, and any number of such pairs may be mounted and electrically interconnected in ways well known in the art to constitute bridges, full-wave rectifier connections and the like. It will be observed that the full-wave bridge illustrated in Fig. 2 comprises 4 such pairs suitably interconnected.

However, for certain other purposes, it may be desirable to utilize rectifier units which, while sealed against intrusion of the atmosphere, are not formed as pairs of the type just described. The unit rectifiers 3 and 4 in Fig. 1 are an illustration of such a situation and show how it is possible to mount rectifier units in pairs having a slightly different arrangement than that just described. As in the case of rectifier units 1 and 2, the units 3 and 4 are mounted with their base plates 9 remote from each other, but instead of separating their contact plates 12 by a single terminal plate 13, the unit rectifiers 3 and 4 are separated from each other by a pair of terminal plates 15, 16, which are insulated from each other by a sheet of suitable insulating material 17. As in the case of unit rectifiers 1 and 2, the backing plates 9 of the rectifiers 3 and 4 extend outward beyond the peripheries of the contact layers 12 and beyond the peripheries of the terminal plates 15, 16. This leaves a peripheral groove which may be filled with the insulating material 14. The terminal plates 15, 16 are provided with portions extending out through the insulating material 14, and these are preferably bent over and provided at their outer ends with suitable holes through which the insulating cylinder 5 may extend, thereby permitting the terminal plates 15 and 16 to make contact with the base plates 9 of the rectifier units 1, 2. A terminal member 18 has its ends provided with holes capable of being slipped over the insulating cylinder 5 so that it can make contact between the base plates 9 of the unit rectifiers 3 and 4.

The unit rectifier pairs 1, 2 and 3, 4 just described are mounted on the insulating sleeve 5 and electrically separated from each other by an insulating collar 19. A pair of insulating washers 21, of sufficient thickness so that their remote faces extend beyond the ends of the insulating sleeve 5, are placed at opposite ends of the rectifier assembly. Suitable metal washers 22 are provided to transfer pressure from the nuts 7 and 8 through the washers 21 to hold the rectifier assembly just described firmly in position.

It will be noted that the outer surfaces of the base plates 9 are exposed and so positioned that they may be readily flooded with streams of air or other cooling agents to efficiently dissipate the heat generated inside the rectifier units. The terminal plates 13, 15, 16 and 18 are further available to efficiently dissipate heat from the base plates 9.

The assembly of unit rectifiers just described may be employed as a full-wave bridge by connecting alternating-current lines to the terminal plates 15, 16 and direct-current lines to the terminal plates 13 and 18.

Referring in detail to Fig. 2, rectifier pairs, similar to the pair 1, 2 described in connection with Fig. 1, are assembled on an insulating sleeve 5 supported on a through bolt 6, similar to members 5 and 6 of Fig. 1. A slight alteration of the respective diameters of the sleeve 5 and the central holes in the unit rectifiers 1, 2 is made to provide room for a conductive sleeve 31 having its ends turned up and making contact with the base plates 9 to interconnect the latter. Four rectifier pairs similar to 1, 2 are mounted on the sleeve 5, being separated from each other by insulating sleeves 19. The contact plate 13 of the two end pairs is provided with an extended end having a hole capable of being slipped over the sleeve 5 and making electrical contact with the conductive sleeves 31 of the next adjacent rectifier pair. The contact plates 13' of the middle set of rectifier pairs are, however, simply interconnected with each other instead of being provided with such extensions connecting them to the sleeves 31. Similarly, the sleeves 31 of the end set of rectifier pairs are connected to each other by a U-shaped bridging member 32.

The above-described structure may be employed as a full-wave bridge by connecting two alternating-current line terminals, respectively, to the bridging members 13 of the end set of rectifier pairs, and by connecting the terminals of a direct-current line, respectively, to the terminal plates 13' of the middle set of rectifier pairs and to the member 32.

By reason of the fact that the base plates 9, of all the rectifier groups, are fully and efficiently exposed to the action of an air stream or other cooling medium, the above-described arrangements make it possible to employ rectifier units of a given size to yield power outputs materially higher than those of prior art arrangements, in which unit rectifiers were mounted on through bolts with their base plates in homologous positions. It is thus possible to dispense with the cooling fins or plates which were frequently embodied by certain elements of rectifier units mounted in accordance with this practice of the prior art, and yet to make a saving in the total space occupied by a rectifier capable of providing a given power output with a given ventilating system.

I claim as my invention:

A rectifier assembly comprising a central insulating support and four unit rectifiers mounted thereon in pairs, each pair comprising two unit rectifiers with their like faces adjacent each other, a terminal plate sandwiched between the like faces of one pair, a pair of terminal plates separated by insulation sandwiched between the like faces of the other pair, and means for connecting said pair of terminal plates respectively to the remote faces of the rectifiers of the first-mentioned group.

CARL C. HEIN.

REFERENCES CITED

The following references are of record in the file of this patent:

UNITED STATES PATENTS

| Number | Name | Date |
| --- | --- | --- |
| 1,738,113 | Ogden | Dec. 3, 1929 |
| 1,795,438 | Peter | Mar. 10, 1931 |
| 1,842,360 | Kahler | Jan. 19, 1932 |
| 1,989,311 | Fruth | Jan. 29, 1935 |
| 1,989,463 | Ruben | Jan. 29, 1935 |
| 2,017,842 | Conant | Oct. 22, 1935 |
| 2,083,647 | Gilson | June 15, 1937 |
| 2,126,765 | Freeman | Aug. 16, 1938 |
| 2,157,895 | Hein | May 9, 1939 |
| 2,205,897 | Brunke | June 25, 1940 |